(12) United States Patent
Kelly et al.

(10) Patent No.: US 7,375,889 B1
(45) Date of Patent: May 20, 2008

(54) APPARATUS AND METHOD FOR CONTROLLING POLARIZATION IN AN OPTICAL COMMUNICATIONS MEDIUM

(75) Inventors: Jack Robert Kelly, Stow, OH (US); Xuewu Liu, Westerville, OH (US)

(73) Assignee: Coadna Photonics, Inc., San Jose, CA (US)

(*) Notice: Subject to any disclaimer, the term of this patent is extended or adjusted under 35 U.S.C. 154(b) by 0 days.

(21) Appl. No.: 11/361,102

(22) Filed: Feb. 23, 2006

Related U.S. Application Data

(62) Division of application No. 10/722,836, filed on Nov. 26, 2003, now Pat. No. 7,035,009.

(51) Int. Cl.
G02B 27/28 (2006.01)

(52) U.S. Cl. .................. 359/501; 359/246; 359/494; 250/225

(58) Field of Classification Search .......... 359/501
See application file for complete search history.

(56) References Cited

U.S. PATENT DOCUMENTS

| | | | |
|---|---|---|---|
| 3,574,441 A | 4/1971 | Harris et al. |
| 3,644,016 A | 2/1972 | Macken |
| 4,966,431 A | 10/1990 | Heismann |
| 4,979,235 A | 12/1990 | Rumbaugh et al. |
| 5,004,312 A | 4/1991 | Shimizu |
| 5,005,952 A | 4/1991 | Clark |
| 5,132,826 A | 7/1992 | Johnson et al. |
| 5,212,743 A | 5/1993 | Heismann |
| 5,412,500 A | 5/1995 | Fergason |
| 5,414,546 A | 5/1995 | Fergason |
| 5,473,465 A | 12/1995 | Ye |
| 5,561,726 A | 10/1996 | Yao |
| 5,658,490 A | 8/1997 | Sharp et al. |
| 6,046,786 A | 4/2000 | Sharp et al. |
| 6,078,374 A | 6/2000 | Sharp et al. |
| 6,330,097 B1 | 12/2001 | Chen et al. |
| 6,380,997 B1 | 4/2002 | Sharp et al. |
| 6,404,538 B1 | 6/2002 | Chen et al. |
| 6,552,836 B2 | 4/2003 | Miller |
| 6,700,694 B2 | 3/2004 | Zou et al. |
| 6,765,723 B1 | 7/2004 | Savory |
| 6,784,416 B2 | 8/2004 | Biyikli |
| 2001/0028760 A1 | 10/2001 | Yaffe |
| 2003/0002131 A1 | 1/2003 | Zou et al. |
| 2003/0174400 A1 | 9/2003 | Patel et al. |
| 2004/0262499 A1 | 12/2004 | Martinelli et al. |

OTHER PUBLICATIONS

R. Noé, H. Heidrich, D. Hoffmann, 'Endless Polarization Control Systems for Coherent Optics', J. Lightwave Tech., vol. 6, No. 7, Jul. 1988, pp. 1199-1208.*

* cited by examiner

*Primary Examiner*—Amel C Lavarias
(74) *Attorney, Agent, or Firm*—Cooley Godward Kronish LLP

(57) ABSTRACT

A method for resetting a polarization controller includes determining that the phase magnitude is associated with a first range of phase angles and generating a first control signal having a first characteristic if the phase magnitude is increasing, and generating the first control signal having a second characteristic if the phase magnitude is decreasing. The phase magnitude associated with a second range of phase angles is determined. The first control signal having the second characteristic is generated if the phase magnitude is increasing. The first control signal having the first characteristic is generated if the phase magnitude is decreasing.

6 Claims, 16 Drawing Sheets

APPARATUS AND METHOD FOR CONTROLLING POLARIZATION IN AN OPTICAL COMMUNICATIONS MEDIUM

CROSS REFERENCE TO RELATED APPLICATIONS

This application is a divisional of patent application Ser. No. 10/722,836, filed on Nov. 26, 2003, now U.S. Pat. No. 7,035,009 entitled "Apparatus And Method For Controlling Polarization In An Optical Communications Medium."

BRIEF DESCRIPTION OF THE INVENTION

The present invention relates to optics, fiber optics, and optical communication systems. More particularly, the present invention relates to polarization controllers having application in communications, optical detection, optical instrumentation and other related areas.

BACKGROUND OF THE INVENTION

Temperature fluctuations, physical stresses, and other environmental conditions affect the fibers of an optical communication system. In particular, these factors give rise to fiber birefringence, which can unpredictably change the states of polarization (SOP) of an optical signal traveling in a fiber, especially in a single-mode fiber. These changes in the SOP are manifested as fading of the optical signal at the output end of a fiber (i.e., polarization dependent loss (PDL)) and, in some instances, polarization mode dispersion (PMD) loss.

To correct the polarization state of optical signals emerging from an optical fiber, some conventional polarization controllers typically transform the output polarization states of optical signals into prescribed or preferred polarization states for a specific application, such as interferometric signal processing or PMD compensating. Using well-known algorithms, other conventional polarization controllers can transform any arbitrarily varying input SOP of an optical signal into any arbitrary output SOP by either rotating wave-plates or varying the phase retardation of wave-plates.

To effectuate endless tracking and control of SOP for an optical signal, one approach requires an electro-optical polarization controller to include a reset cycle when the controller's operating range is exceeded. But these reset cycles generally gives rise to periods of unacceptable data loss. Therefore, some SOP controllers operate in a limited control range with occasional resetting to obtain a complete range of SOP control for optical signal transmission, which minimizes the loss of a polarization state of a local optical signal or information.

Some other types of conventional polarization controllers provide endless and continuous control of SOP almost over an infinite range rather than being restricted to a limited range of operation. These types of controllers have been designed to include cascaded polarization transformers, each having a limited transformation range. Examples of polarization transformers are fiber squeezers and electro-optic devices using lithium niobate or liquid crystal wave-plates. While these combined, cascaded devices permit substantially endless (reset-free) operation overall, individual constituent elements within traditional polarization control devices still require occasional reset cycles.

Although the reset cycles can be performed without affecting the overall polarization transformation (i.e., quasi-endless polarization control), these devices generally require complicated, computer-controlled driving algorithms for proper operation, which generally results in a slow response to fluctuations in SOP. A common approach to keep output SOP invariant uses additional variable wave-plates with liquid crystal or fiber squeezer-based polarization controllers with a computer or processor to control the phase retardation of the wave-plates. The computer calculates how best to satisfy a pair of equations for resetting the driver voltage to an initial value, and then limits electrical-driving devices to a specific range of operation. In this approach, a reset operation occurs only when the driver voltage reaches a maximum limit. This approach, however, tends to result in slow resetting of polarization controller elements, which in turn results in suboptimal control of SOP.

A first type of traditional polarization controller uses an electrical-field to control liquid crystal (LC) cells as variable wave-plates. FIG. 1A illustrates an example of this type of polarization controller. Polarization controller 100 includes four cells 101, 102, 103, and 104, where slow (i.e., horizontal) axes 105 and 107 of respective cells 101 and 103 are either parallel or perpendicular to each other, and the slow axes of cells 106 and 108 are oriented at ±45 degrees to the axis of cell 101. A computer-controlled driving algorithm or a switchable, double optical path is used for resetting controller 100, which occurs at a relatively slow resetting speed. A drawback to this approach is that four electrical LC drivers (shown as drivers 1, 2, 3 and 4) are required for this type of polarization controller to transform any arbitrarily varying input into any arbitrary output.

Liquid crystal-based polarization controller devices are widely used as phase modulation devices. Liquid crystals include fluids that derive their anisotropic physical properties from the long-range orientational order of their constituent molecules. Also, liquid crystals exhibit birefringence, which is a function of the orientation of the liquid crystal molecules. The orientation can be controlled by the intensity of an applied electric field. For a normal liquid crystal used as a phase retarder, the phase retardance, $\delta$, depends on the liquid crystal layer thickness, d, and birefringence, $\Delta n$, as expressed in Equation 1. That is:

$$\delta = \frac{2\pi d \Delta n}{\lambda}, \qquad \text{(Equation 1)}$$

where $\lambda$ is the wavelength of the incident light. For a half-wave plate, $\delta = \pi$.

Reorientation of the liquid crystal molecules under the influence of an applied field introduces elastic strains in the material. These strains stem from constraints imposed on the molecular orientation at the boundaries confining the liquid crystal. These surface constraints are given the term "surface anchoring." In most practical applications, the surface anchoring is such that molecules close to a surface are not free to reorient, but rather remain substantially along some preferred direction.

When an electric field is applied to a liquid crystal element, such as, a homogenously-aligned half-wave plate, the directors of LC molecules are reoriented in response to the applied field. Typically, the response time is usually ~1 ms, depending on the properties of the LC. During the response time, the phase retardance of the half-wave plate is a non-linear function of time. Generally, substantially similar cells show similar time functions.

A second type of traditional polarization controller uses fiber squeezers to mechanically induce birefringence in the fiber axes, which in turn causes retardation between the two orthogonal modes perpendicular and parallel to the direction of pressure. FIG. 1B shows an example of this type polarization controller. Polarization controller 150 includes first to fifth fiber squeezers 160, 162, 164, 166, and 168, each comprising a pair of piezo-electric actuators 154 and 156. Polarization controller 150 further comprises a single mode optical fiber 152 that receives side pressures from each pair of piezo-electric actuators 154 and 156 to generate birefringences. Polarization controller 150 also includes a control unit 170. Control unit 170 includes an A/D converter 176, a microprocessor unit 174 and a D/A converter 172 for driving fiber squeezers to change the SOP of an optical signal. A drawback to polarization controller 150 is that it uses five drivers, each of which requires resetting. Another example of this type of polarization controller uses a rotatable fiber clamp to supply the necessary retardation and optical axis orientation. But because this controller requires mechanical movement for its control, polarization fluctuation in transmission fibers typically cannot be controlled in real time.

A third type of polarization controller provides substantially reset-free, endless polarization transformations from any arbitrarily varying optical input polarization into any arbitrarily output polarization. This type operates by producing adjustable elliptical birefringence of constant total phase retardation in a single-mode fiber. A particular transformation is obtained by adjusting the azimuth of linear birefringence and the ratio of linear-to-circular birefringence. Structurally, this type of controller is made up of three controllable fractional wave elements (i.e., plates) in cascaded combination. To realize endless polarization transformations, the orientations of optical-axes of the fractional wave plate elements are controlled such that the fractional wave elements function the same as three cascaded rotating wave-plates (such as an endlessly rotatable half-wave element and two synchronously rotatable quarter-wave elements). This type of polarization controller can be realized using either distributed bulk optic devices or integrated electro-optic waveguide devices. Proper rotation of the wave elements is afforded by using a feedback control circuit to monitor the outputted optical polarization, and then to generate an appropriate electrical drive signal to achieve the proper rotation. Although this type of polarization controller operates sufficiently for most of its intended functions, it does not provide suitable wavelength and temperature independence.

Besides the relatively slow resetting of conventional liquid crystal-based polarization controllers, the drawbacks associated with the above-mentioned polarization controllers include, among other things, relatively high cost, elevated operating voltages, mechanical fatigue, and high insertion loss.

In view of the foregoing, a polarization controller having a fast resetting capability is highly desirable. Ideally, the polarization controller would be an inexpensive, highly responsive device for controlling SOP of optical signals emerging from optical fiber systems, and would have improved polarization mode dispersion compensation for high-speed, optical communication systems.

SUMMARY OF THE INVENTION

The invention includes a polarization controller and method for controlling such devices. In one embodiment of the invention, a polarization controller comprises a first element having a first optical axis and configured to receive light having a first phase, a second element having a second optical axis and configured to emit the light having a second phase, a third element having a third optical axis where at least a portion of the third element is interstitial to the first element and the second element, a first driver coupled to the first and the second element to reset the third element, and a second driver coupled to the third element. In some embodiments, liquid crystals are used as a constituent of at least one of the optical elements for providing control of polarization with relatively low operating voltages at relatively low cost. By proper arrangement (e.g., orthogonal alignments) of such liquid crystal-based wave-plates, the non-linear effects of the transient processes can be canceled.

In another embodiment, an exemplary polarization controller further comprises a drive-control module configured to cause the second driver to generate the second control signal having a first characteristic if a direction of the phase is determined to be increasing and if the magnitude of the first phase is associated with a first subset of phase angles. The drive-control module is also configured to cause the second driver to generate the second control signal having a second characteristic if the direction of the phase is determined to be increasing and if the magnitude of the first phase is associated with a second subset of phase angles.

In yet another embodiment, an exemplary method for controlling a polarization controller comprises determining that the phase magnitude is associated with a first range of phase angles. If so, then the controller generates a first control signal having a first characteristic if the phase magnitude is increasing, or generates the first control signal having a second characteristic if the phase magnitude is decreasing. But if the controller determines that the phase magnitude is associated with a second range of phase angles, then the controller generates the first control signal having the second characteristic if the phase magnitude is increasing, or generates the first control signal having the first characteristic if the phase magnitude is decreasing.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings.

DETAILED DESCRIPTION OF SPECIFIC EMBODIMENTS

The present invention provides a number of polarization controller devices, and methods for resetting polarization controller devices. In one embodiment of the present invention, an exemplary polarization controller device includes a stack of variable polarization converters formed with twisted nematic (TN) liquid crystal cells. In another embodiment of the present invention, an exemplary polarization controller device includes cascaded wave plates, where each wave plate has a fixed optical axis and is composed of birefringent liquid crystal material. According to the present invention, the polarization controller performs general polarization transformations from any arbitrarily varying optical input SOP into any arbitrary output SOP by adjusting either the phase retardation of variable wave plates or the rotation angle of polarization rotators, or both. In yet another embodiment, a polarization controller device operates in accordance with an exemplary method of the present invention to, for example, simplify the computations (e.g., performed by electronic hardware or software, or both) required for determining when to perform a reset, thereby enabling quick resets.

Figure 1A:
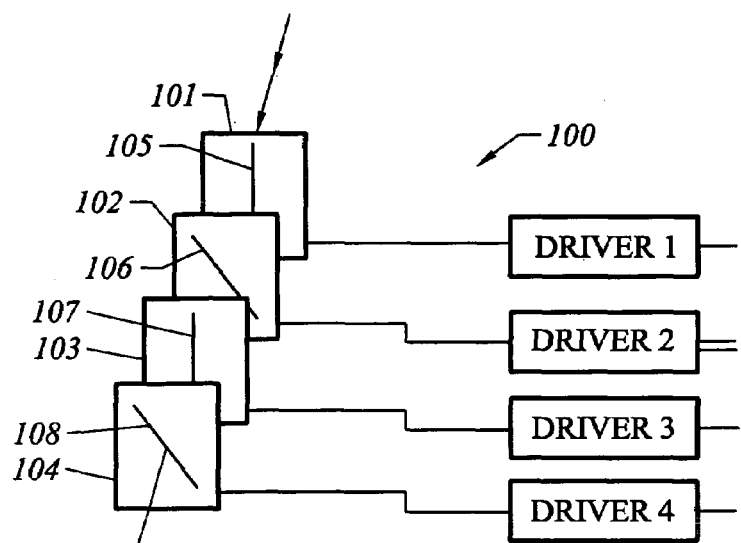
FIGS. 1A and 1B shows diagrams of two prior art polarization controllers.
Figure 1B:
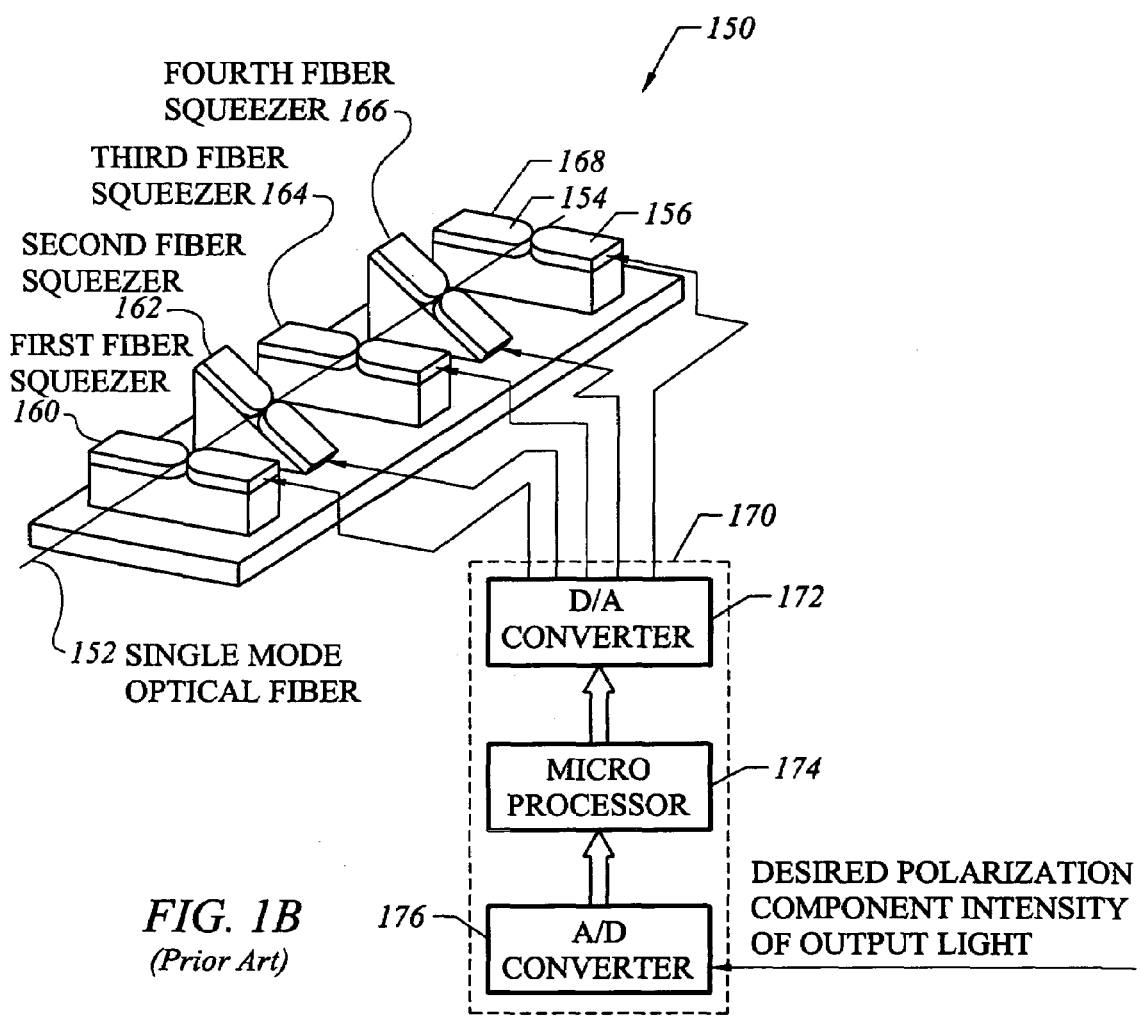
Figure 2:
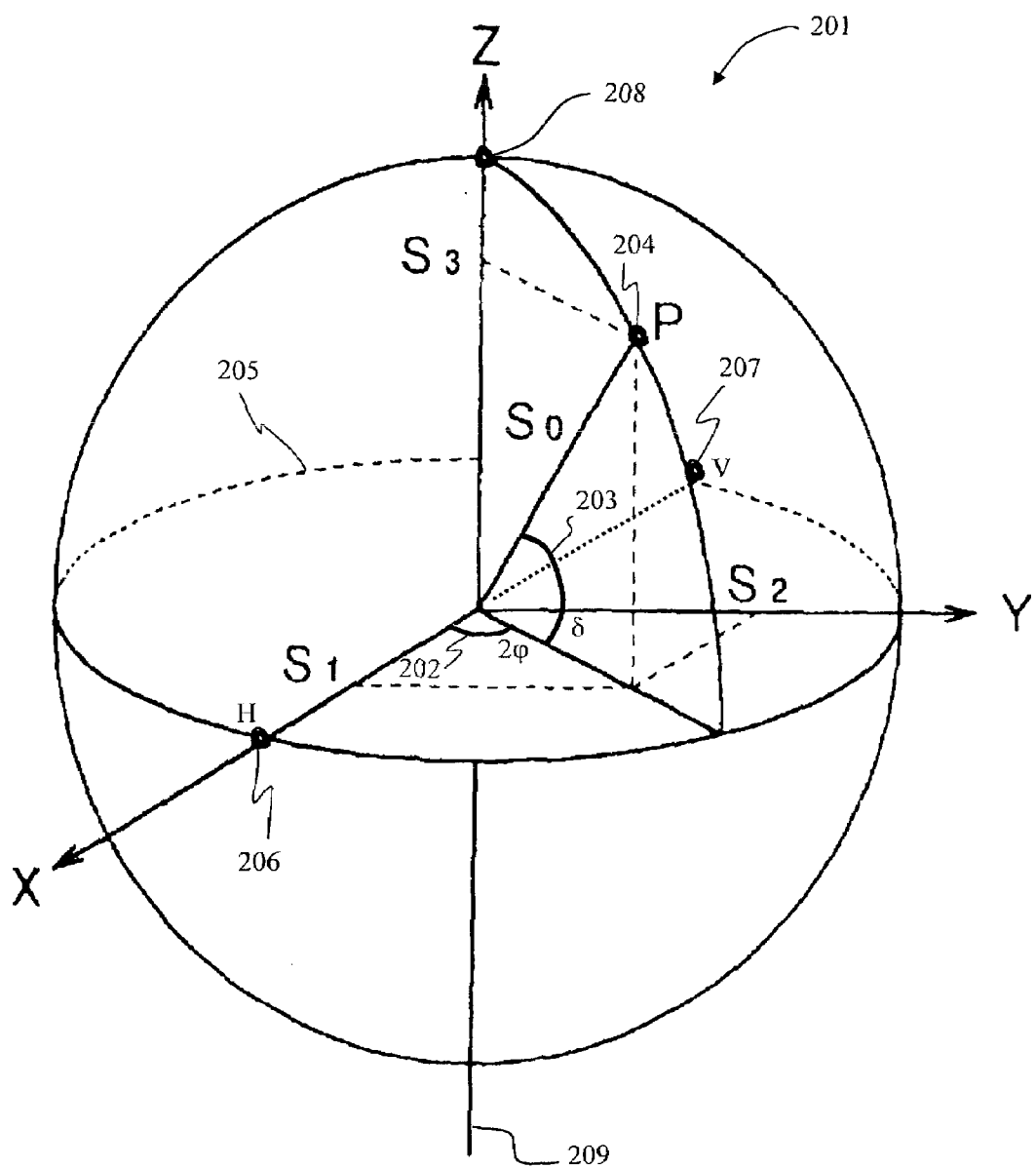
FIG. 2 shows a Poincare' sphere for describing the operation of exemplary polarization controllers in accordance with various embodiments of the present invention.

FIG. 2 shows a Poincare' sphere for representing polarization transformations of incoming optical signals. In this example, Poincare' sphere 201 is a unit-radius spherical surface (radius, r, is 1) on which each point represents a different polarization form. The point of representation is uniquely determined by the polarization angle $2\phi$ 202, and the phase angle $\delta$ 203. For example, the spherical coordinate of point P 204 in FIG. 2 is (1, $\delta$, $2\phi$). Further, the Cartesian coordinates of points on Poincare sphere can be depicted as three Stokes parameters, S1, S2, and S3. A point on equator 205 represents linear polarization in a different polarization direction. Point H 206 on equator 205 represents horizontally polarized light, and point V 207 represents vertically polarized light, which is diametrically opposed to point H 206. The two intersections of equator 205 with the X-axis represent two linear polarized modes having a 45-degree angle. Any point located other than on equator 205 on Poincare' sphere 201 represents elliptical polarization. North Pole 208 and South Pole 209 represent right-circular (RC) and left-circular (LC) polarization, respectively.

An exemplary polarization controller according to at least one embodiment of the present invention transforms the SOP of incoming optical signals using one or more of the following Equations (2) through (7). An arbitrary polarization can be represented by using the Jones Matrix of Equation (2):

$$\begin{pmatrix} a \\ b \end{pmatrix} = \begin{pmatrix} \cos\varphi\cos\delta - i\sin\varphi\sin\delta \\ \sin\varphi\cos\delta + i\cos\varphi\sin\delta \end{pmatrix} \quad \text{(Equation 2)}$$

where $\phi$ and $\delta$ are the azimuth angle and ellipticity angle, respectively. When a polarized light beam passes through an optical device, the change of polarization can be described as in Equation (3):

$$\begin{pmatrix} a' \\ b' \end{pmatrix} = M \begin{pmatrix} a \\ b \end{pmatrix}, \quad \text{(Equation 3)}$$

where M represents the transforming Jones Matrix.

For example, the Jones Matrix of a linear retarder with retardation, $\phi$, and an angle to the x-axis, $\alpha$, is:

$$D(\phi, \alpha) = \quad \text{(Equation 4)}$$
$$\begin{vmatrix} e^{i\phi/2}\cos^2\alpha + e^{-i\phi/2}\sin^2\alpha & e^{i\phi/2}\cos\alpha\sin\alpha - e^{-i\phi/2}\cos\alpha\sin\alpha \\ e^{i\phi/2}\cos\alpha\sin\alpha - e^{-i\phi/2}\cos\alpha\sin\alpha & e^{i\phi/2}\sin^2\alpha + e^{-i\phi/2}\cos^2\alpha \end{vmatrix}$$

As another example, a matrix representing a $\theta$-degree rotator (to rotate a polarization ellipse by $\theta$ while not changing the ellipticity) is shown in Equation (5) as:

$$R(\theta) = \begin{vmatrix} \cos\theta & \sin\theta \\ -\sin\theta & \cos\theta \end{vmatrix} \quad \text{(Equation 5)}$$

By proper combination of the matrix, an arbitrary input SOP can be transformed to any predefined output SOP. Two well-known such combinations are:

$$M=D(\pi/2,\alpha_1)D(\pi,\alpha_2)D(\pi/2,\alpha_1) \quad \text{(Equation 6)}$$

and $$M=D(\phi_1,0)D(\phi_2,\pi/4)D(\phi_3,0) \quad \text{(Equation 7)}$$

The transformations described by $R(\theta)$ in Equation 5 correspond on Poincare' sphere 201 to rotations of the representation vector through an angle $2\theta$ about the Z-axis. The term $D(\phi,0)$ corresponds to a rotation $\phi$ about the X-axis, which varies the phase retardation of a wave plate oriented horizontally. The term $D(\phi,\pi/4)$ represents a rotation about the Y-axis, which corresponds to varying the phase retardation of a wave plate oriented at 45-degrees above horizontal. By using, the transformations of Equations (5) and (6), the whole surface of Poincare' sphere 201 can be covered to transform any arbitrary input SOP into any output SOP. In a specific embodiment, one or more of the above-described equations can be used in, or as a part of, a module, which can be constituted of hardware, software, or a combination thereof, to operate a polarization controller in accordance with the present invention. For example, a transformation can be performed using a computing device configured to execute instructions (i.e., computer algorithm) as a part of the functionality of the polarization controller.

Figure 3:
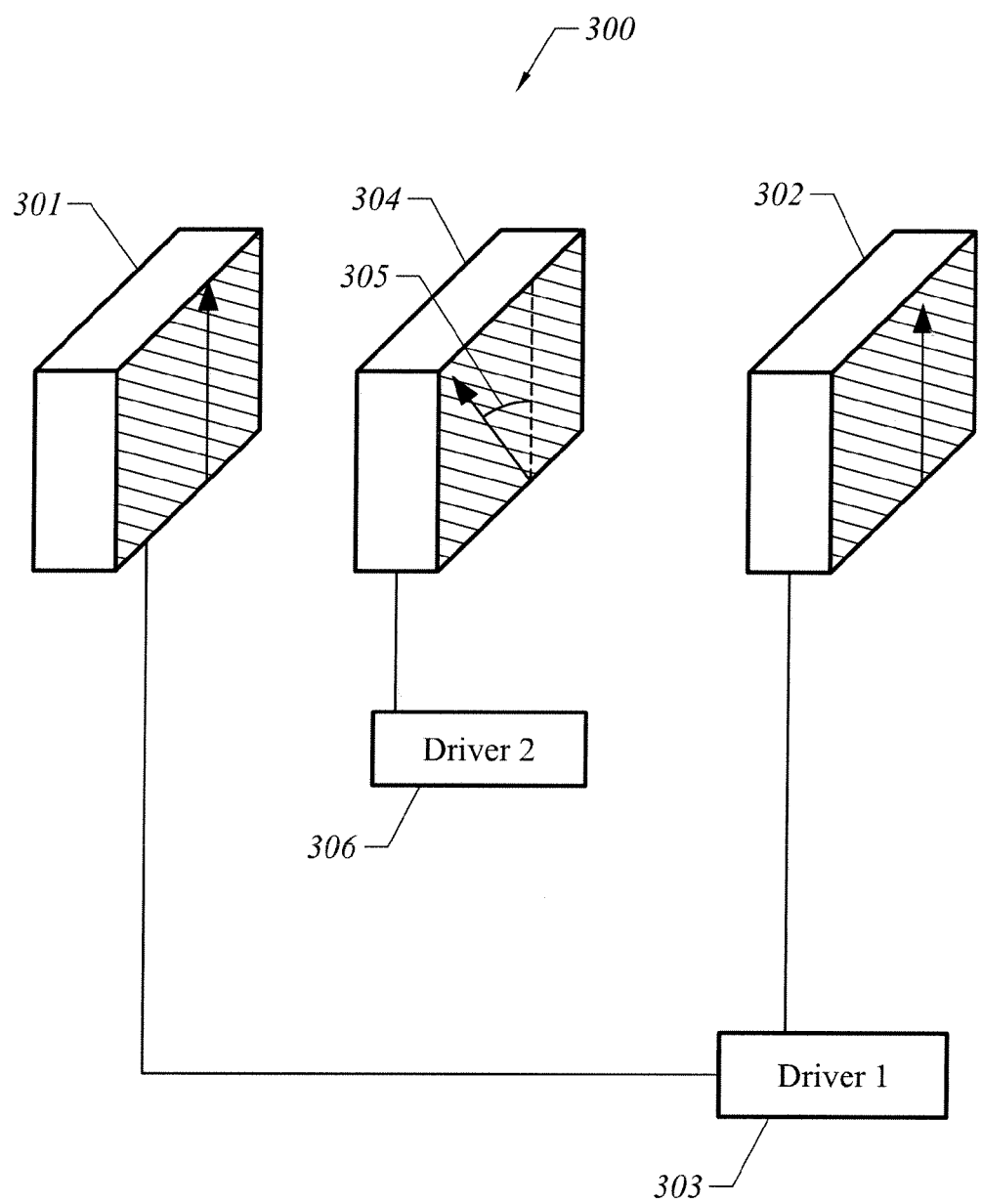
FIG. 3 illustrates an exemplary polarization controller in accordance with a specific embodiment of the present invention.

FIG. 3 illustrates an exemplary polarization controller 300 for varying and/or maintaining the polarization of an input beam of light according to one embodiment of the present invention. An exemplary polarization controller includes three polarization-rotating wave-plates; two electrically coupled half-wave plates, and an electrically controllable full-wave plate. The full-wave plate can be located between the two half-wave plates and at a 45-degree angle to the half-wave plates. The two outer-most half-wave plates are substantially similar and are configured to be driven simultaneously. As is described herein and shown in FIG. 3, an exemplary SOP controller according to this embodiment needs only two control parameters. That is, only two drivers need to operate to perform polarization control.

Further, the polarization controller operates in two modes; a normal mode and reset mode. In normal mode, the three variable wave-plates cooperate to complete the transformation of the SOPs. In reset mode, a pair of resetting devices is switched on or off accordingly, and the operation direction is inversed to reach endless SOP transforming.

As shown in FIG. 3 first 301 and third 302 wave-plates are electrically coupled for operating driver 303 (shown as driver1). Second wave-plate 304 is oriented at, or around, a 45-degree angle 305 to first wave plate 301, and is driven by another driver 306 (shown as driver2). In this case, first 301 and third 302 wave plates of polarization controller 300 have similar optical characteristics such that a transformation performed by polarization controller 300 can be represented by:

$$M=D(\phi_1,0)D(\phi_2,\pi/4)D(\phi_1,0). \quad \text{(Equation 8)}$$

Exemplary polarization controller 300 provides a relatively simple SOP controller device, especially as applied in optical communication systems. In this scheme, each polarization corresponds to unique a combination of φ1 and φ2. Generally, polarization controller 300 can be configured to transform any arbitrary input SOP via Poincare' sphere 201 of FIG. 2 to any defined output SOP.

Figure 4:
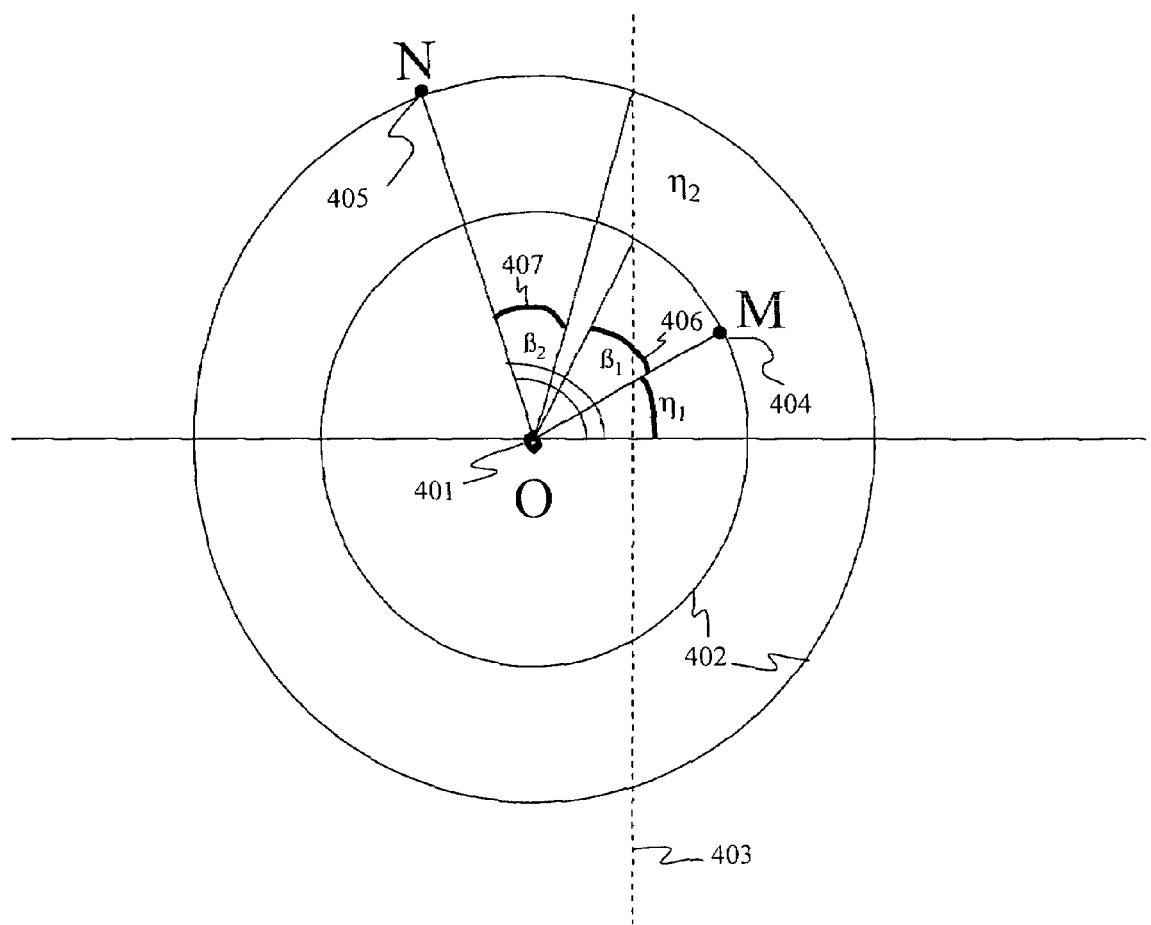
FIG. 4 shows a projection of the Poincare' sphere of FIG. 2 for describing the functionality of the polarization controller of FIG. 3.

FIG. 4 shows a projection of Poincare' sphere 201 as viewed from the X direction. In this view, circles 402 are centered at point O 401 and represent tracks of variation of phase retardation oriented along the X-axis (i.e., D(φ1,0)). Vertical line 403 represents a track of variation of phase retardation oriented at 45 degrees to the X axis (D(φ2,π/4)). In FIG. 4, points M 404 and N 405 are input polarization and output polarization, respectively, which have coordinates (r1, η1) and (r2, η2). The coupled first 301 and third 302 wave-plates of FIG. 3 function as phase retarders with phase retardation φ1=β, where β is value of each angle 406 and 407. The value of β can be determined by the following:

$$\tan\beta = \frac{r_1\cos\eta_1 - r_2\cos\eta_2}{r_1\sin\eta_1 + r_2\sin\eta_2} \quad \text{(Equation 9)}$$

Using Stokes parameters, the radius of the circle, r, and angle, η, can be calculated as follows:

$$r = \sqrt{S_2^2 + S_3^2}; \quad \text{(Equation 10)}$$

and $$\tan(\eta) = \frac{S_3}{S_2}. \quad \text{(Equation 11)}$$

Setting the Stokes parameters of an incident beam to be (D0, D1, D2, D3), and the resulting output beam to be (S0, S1, S2, S3), then φ1 can be determined from the following:

$$\tan\phi_1 \equiv \tan\beta = \frac{D_2 - S_2}{D_3 + S_3} \quad \text{(Equation 12-a)}$$

Similarly, φ2 can also be determined. In another exemplary polarization controller 301, the optical axes of first 301 and second 302 wave-plates, as phase retarders, can be crossly arranged such that:

$$\tan\phi_1 \equiv \tan\beta = \frac{D_2 - S_2}{D_3 - S_3} \quad \text{(Equation 12-b)}$$

Similarly, φ2 can also be determined.

In accordance with another embodiment of the present invention, an exemplary method of controlling states of polarization is described below in connection with FIGS. 5A, 5B and 5C. With this method, polarization controller device 580 of FIG. 5C can be reset quickly and simply. Polarization controller device 580 includes a pair of switchable optical devices (e.g., wave-plates) placed substantially outside a specific optical device requiring reset. To provide endless tracking of incident SOP, polarization controller 580 uses, a periodic, varying control signal (e.g., control voltage) for switching the pair of resetting devices. In other embodiments of the present invention, the disclosed method can be applied to any kind of polarization controller, such as electrically-, mechanically- or magnetically-controllable optical devices.

Figure 5A:
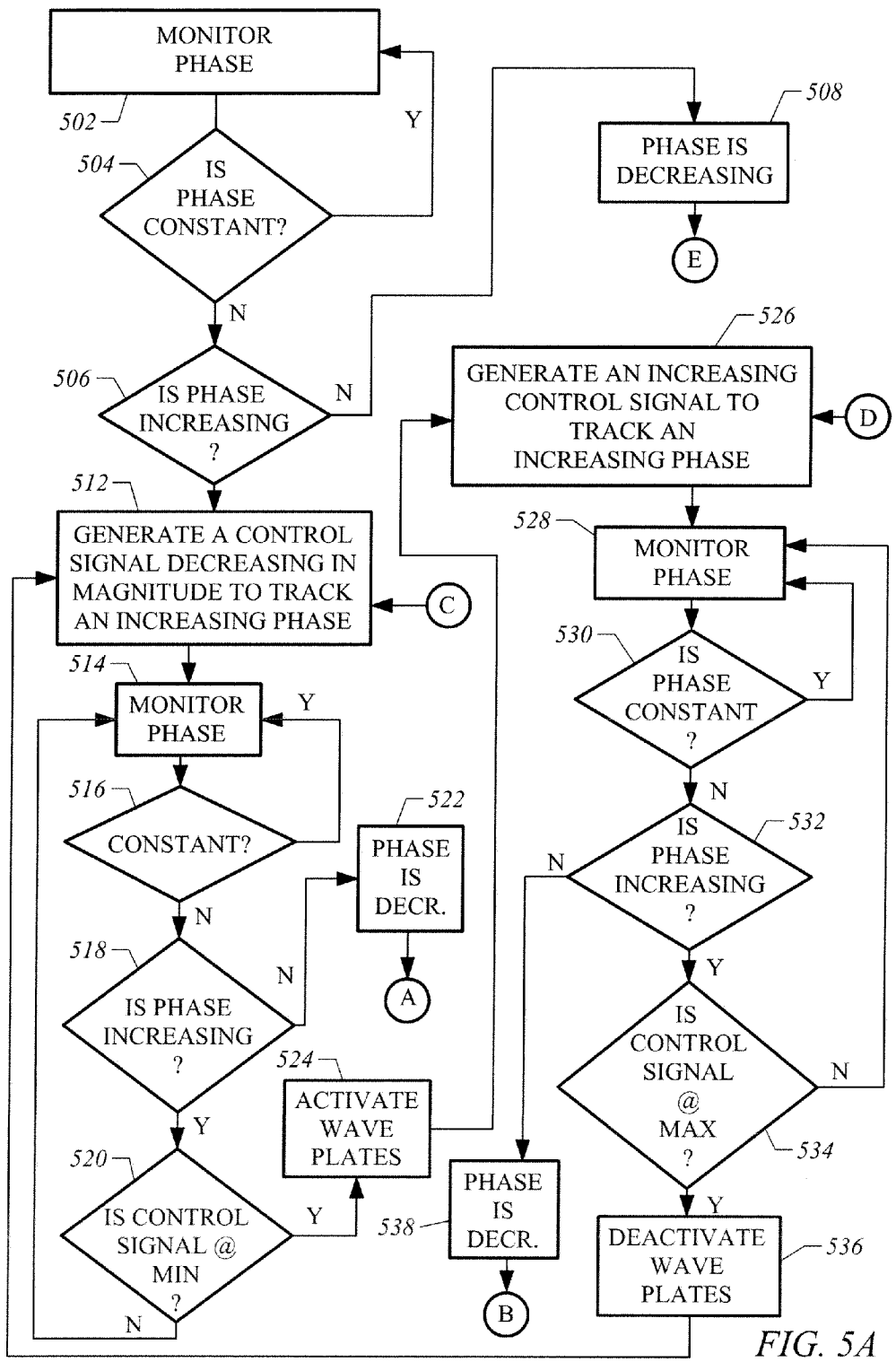
FIG. 5A is a flow diagram of an exemplary method of resetting a wave plate in accordance with an embodiment of the present invention.
Figure 7:
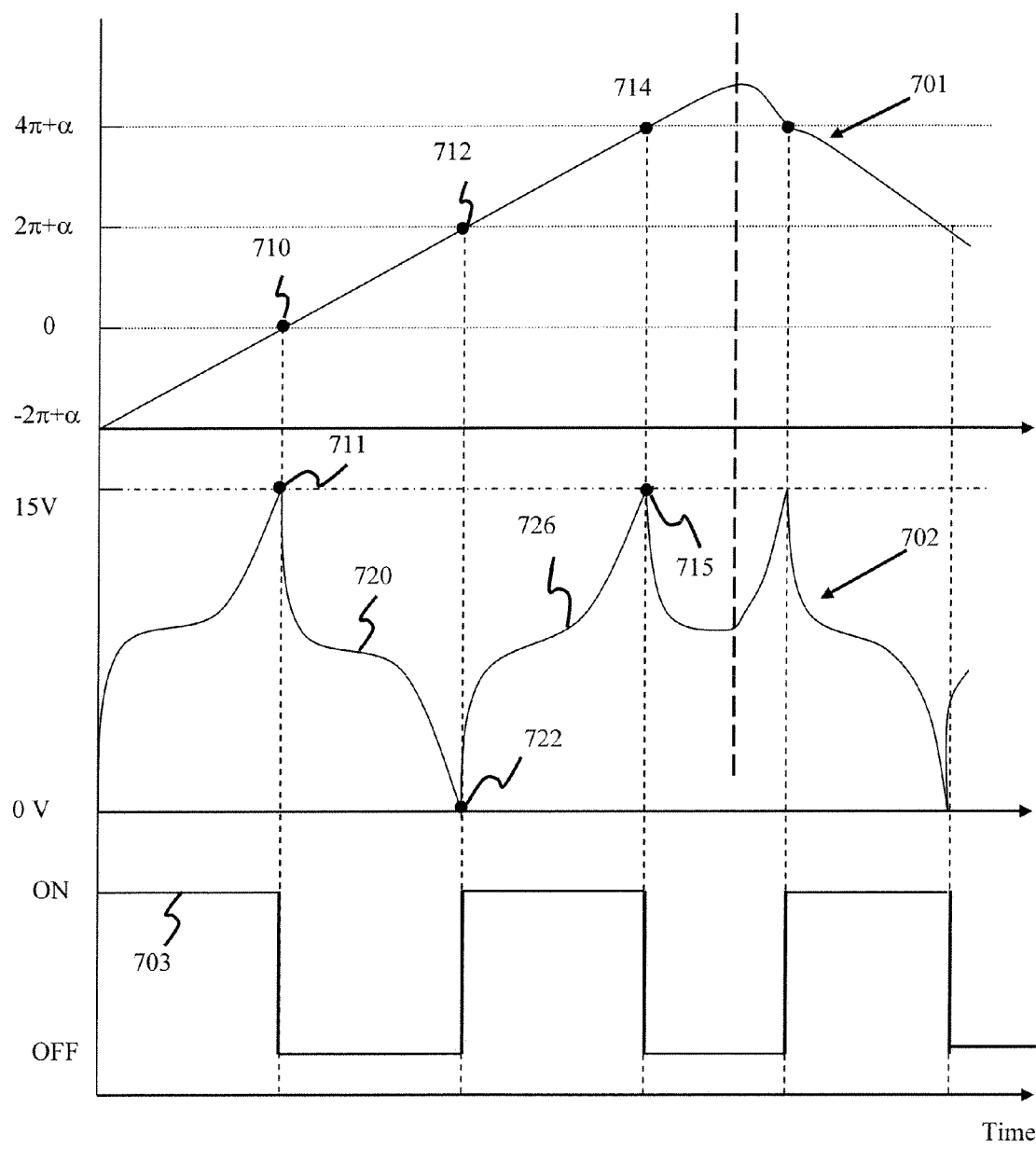
FIG. 7 is a graphical plot showing several parameters that typically change during a reset according to an exemplary method of the present invention.

FIG. 5A is a flow diagram of an exemplary method of resetting a polarization controller of the invention. First, a phase of incident light is monitored periodically, or at variable points in time, at block 502. In some cases, a reference for control signal can be set at, or before block 502. For example, a control voltage of 15 volts can be attributed to a phase angle of zero degrees, or 0π radians. For example, if curve 701 of FIG. 7 represents a phase of an optical signal, then point 710 is the reset point in this instance, where the control voltage is at 15 volts at 0π. Thereafter, a polarization controller can respond to increases in phase angles (i.e., positive phase angles) by decreasing the control voltage (e.g., in a linear or near-linear fashion) to increase the amount of phase retardation. For example, curve 720 between points 711 and 722 represents such a decrease of control voltage.

If the phase does not change at block 504 of FIG. 5A since it was last monitored, then the incident light is monitored further at block 502. But if the phase changes, then a determination is made as to whether the phase is increasing at block 506. If the phase is not increasing, then the polarization controller determines that the phase is decreasing at block 508. In this case, the method flows to block 552 of FIG. 5B (i.e., from point shown as encircled "E" on FIG. 5A to point shown as encircled "E" on FIG. 5B; similarly encircled alphanumeric characters represent point-to-point flow between FIGS. 5A and 5B.).

If the phase is increasing, however, then a control signal having a first characteristic is generated at block 512. In this case, the first characteristic is a decreasing voltage (i.e., decreasing electric field, which can be either linear, or sometimes non-linear) applied to a variable element (e.g., liquid crystal-based wave-plate), for example, to increase the retarding effects of the variable element. After the control signal is applied to the variable element, the phase is monitored at block 514. If the phase does not change at block 516 since it was last monitored, then the incident light is monitored further at block 514. But if the phase has changed and it is not increasing, then the polarization controller determines that the phase is decreasing at block 522. In this case, the method flows to block 538 of FIG. 5B (i.e., to the point shown as encircled "A" on FIG. 5B). If the phase is increasing at block 518, however, then another determination is made at block 520 as to whether the control signal magnitude is at a first limit (i.e., a minimum voltage). If the magnitude of the control voltage is not at a minimum limit at block 520, then the phase is again monitored at block 514. Otherwise, when the magnitude of the control voltage is at a minimum limit, then one or more of the polarization controller's other elements (e.g., wave-plates) are activated (e.g., switched on) at block 524 to reset the variable element. In this example, the minimum limit (i.e., zero volts) coincides with a phase angle of $2\pi$, which is represented by point 722 of FIG. 7.

After activation, the polarization controller generates a control signal having a second characteristic to track an increasing phase at block 526 of FIG. 5A. At this point in the flow, a control signal having a second characteristic is applied to the variable element, where the second characteristic is an increasing magnitude. But at block 526, the control signal magnitude becomes increasingly positive as the phase increases, which is unlike the situation at block 512. For example, curve 726 of FIG. 7 represents the increasing control voltage magnitude between points 722 and 715 as the phase increases between points 712 and 714 from $2\pi+\alpha$ to $4\pi+\alpha$, where $\alpha$ is an arbitrary phase angle. To summarize the control operations between blocks 528 to 536, if the phase increases to a point where the control signal reaches a maximum voltage at block 534, then the other elements are deactivated at block 536, thus resetting the variable element. The flow continues to block 512. But if the phase decreases at block 538 before the maximum voltage is reached at block 534, then the method flows to block 552 of FIG. 5B (i.e., to point shown as encircled "B" on FIG. 5B).

Figure 5B:
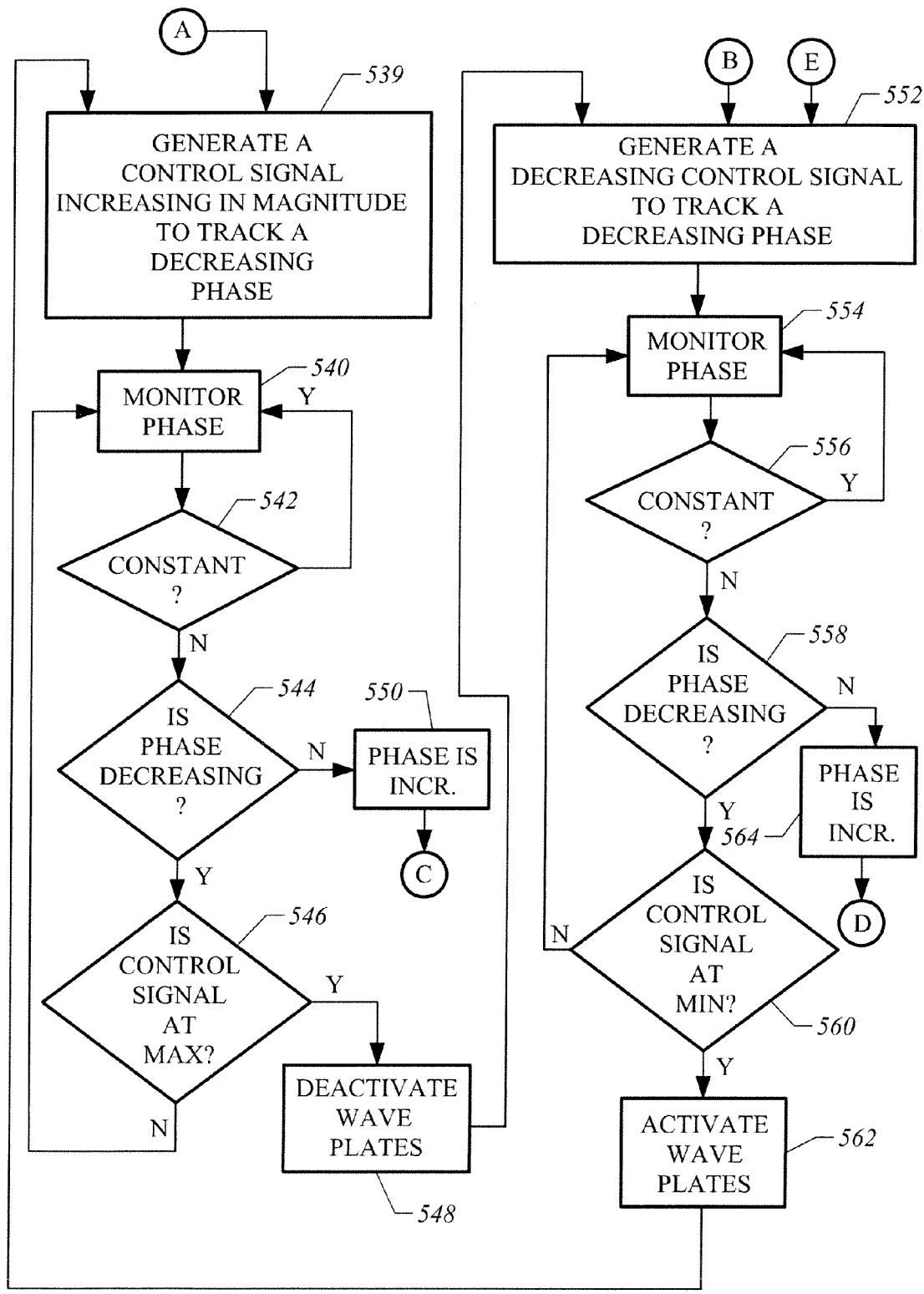
FIG. 5B is another portion of the flow diagram of FIG. 5A.

Returning to FIG. 5A, as the method flows from blocks 522 to 538 of FIG. 5B, the phase is decreasing and a control signal having the first characteristic is applied to the variable wave-plate. Here, the first characteristic is an increasing magnitude as the phase decreases (i.e., the control signal magnitude becomes increasingly larger to minimize the amount of retardation as the phase decreases), such as from $2\pi+\alpha$ (e.g., point 712 of FIG. 7) to 0 (e.g., point 710). The phase is again monitored at block 540 of FIG. 5B and if the phase does not change at block 542 since it was last monitored, then the incident light is monitored further at block 540. But if the phase has changed, then a determination is made as to whether the phase is either continuing to decrease or has begun to increase at block 544. If the phase is determined to be increasing at block 550, then the polarization controller follows the flow back to block 512 of FIG. 5A (i.e., to point shown as encircled "C" on FIG. 5A) to perform the exemplary method as described above.

But if the phase is determined to be decreasing at block 544 of FIG. 5B, then another determination is made as to whether the first characteristic has reached a second limit (i.e., maximum voltage). If the magnitude of the control voltage is not at a maximum limit at block 546, then the phase is again monitored at block 540. Otherwise, when the magnitude of the control voltage is at a maximum limit, then other elements (e.g., other wave-plates) are deactivated (e.g., switched off) at block 548. After deactivation, the polarization controller generates a control signal having the second characteristic to track a decreasing phase at block 552. To summarize the operations between blocks 554 and 562, if the phase decreases to a point where the control signal reaches a minimum voltage at block 560, then the other elements are activated at block 562, with the flow continuing to block 539. But if the phase increases is not decreasing at block 558, the phase is increasing (block 564) and the method flows to block 526 of FIG. 5A (i.e., to point shown as encircled "D.").

Figure 5C:
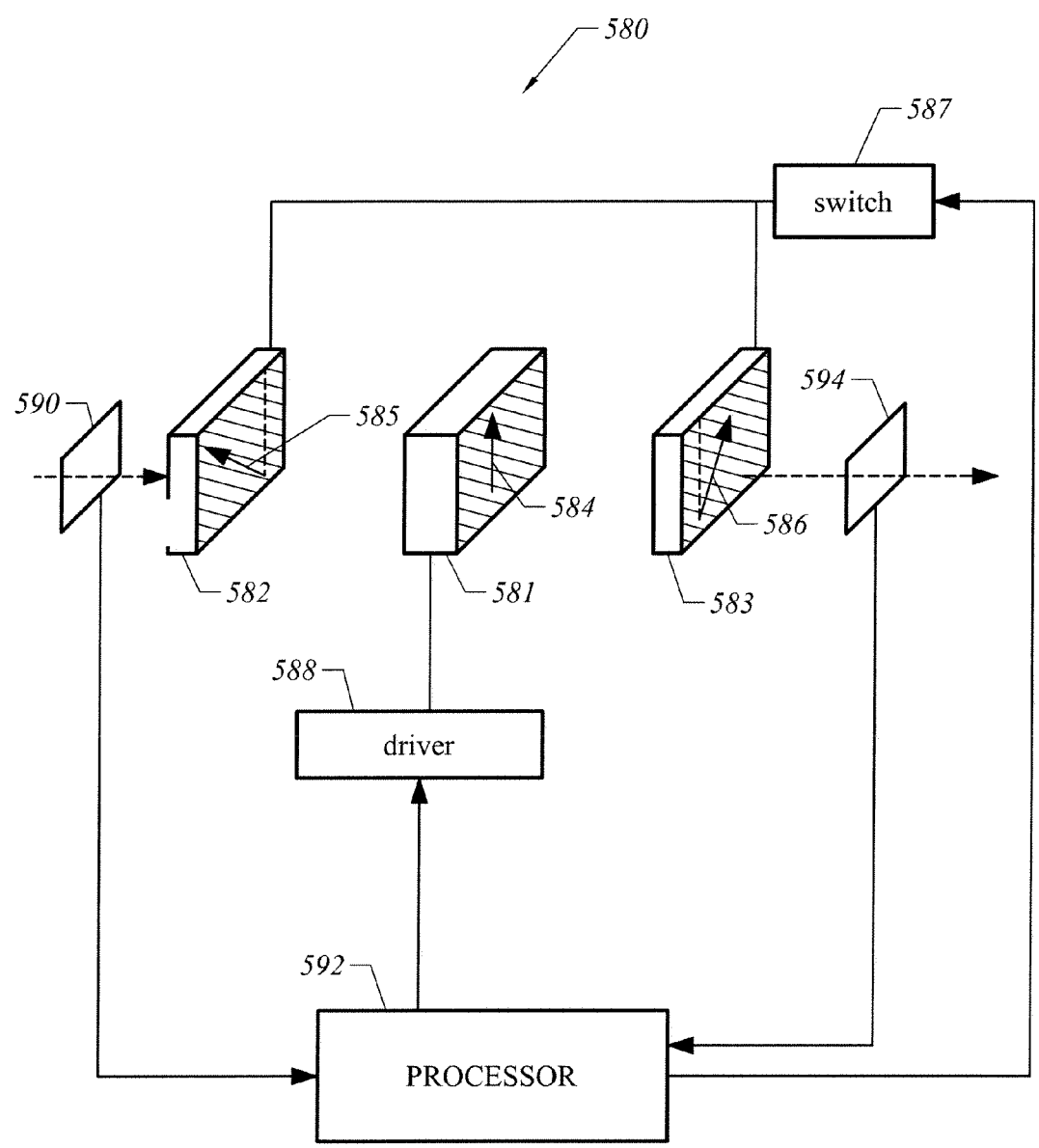
FIG. 5C illustrates exemplary elements for resetting a wave plate in accordance with the exemplary method depicted in FIG. 5A.

FIG. 5C shows an exemplary polarization controller 580, which includes a full-wave plate 581 as a variable element and a pair of crossed half-wave plates 582 and 583 as the other elements of the controller. Plates 582 and 583 are controlled by a switch 587 and are reset in accordance with the method described above in connection with FIGS. 5A and 5B. Full-wave plate 581 is a variable full-wave plate operating as a phase retarder and has a tunable range from 0 to $2\pi$, where "0" corresponds to a maximum driver voltage and "$2\pi$" corresponds to a minimum driver voltage. Half-wave plate 582 has an optical axis 585 perpendicular to an optical axis 586 of half-wave plate 583. Further, optical axes 585 and 586 are each at a 45-degree angle to optical axis 584 of full-wave plate 581. As a control signal (such as a control voltage) increases as the phase of incident light changes, for example, the phase retardation of full-wave plate 581 increases up to $2\pi$. The pair of crossed half-wave plates 582 and 583 then provides for the reset functionality of polarization controller 580, and specifically, for the reset of full-wave plate 581. In one embodiment, each of the wave-plates is liquid crystal-based.

When the control voltage generated by driver 588 reaches a minimum (phase is $2\pi$), switch 587 turns on to activate the pair of half-wave plates 582 and 583 for resetting full-wave plate 581 of polarization controller 580. Thereafter, the control voltage generated by driver 588 increases to track the phase of the optical signal, such as curve 726 between points 722 and 715 shown in FIG. 7 as the phase increases from point 712 to point 714, rather than decreasing the driver voltage, such as curve 720 between points 711 and 722 of FIG. 7 for a phase increasing from point 710 to point 712. When the driver voltage reaches its maximum (e.g., phase is 0), switch 587 turns off to deactivate half-wave plates 582 and 583, and thereafter decreases the driver voltage. For a decreasing phase of an optical signal, resetting works in the opposite way. With this resetting method, the periodic change in control voltage allows endless tracking of SOP.

Polarization controller 580 can include an incident light sensor 590 to monitor the phase of the incident light at the surface of half-wave plate 582 and an optional feedback sensor 594 to monitor the phase of the light emitted from half-wave plate 583. Each of these sensors can be realized using well-known sensor devices. Light sensor 590 is coupled to a processor 592 to provide a signal representative of the phase and direction (i.e., increasing or decreasing) of light. Feedback sensor 594 is coupled to a processor 592 to provide a signal representative of the phase of light after polarization control techniques of the present invention have been applied to process the light. Processor 592 includes hardware, software, or a combination thereof (e.g., processor 592 can be a microprocessor, a software engine, a programmable logic device, etc.), and functions to determine the phase of incident light and whether the phase is increasing, decreasing or remaining the same, and to generate a driver signal in response to the signals generated at least by light sensor 590. Driver 588, which is coupled to processor 592, receives the driver signal and in turn generates a control signal for varying phase retarding capabilities of full-wave plate 581 (i.e., generating a control signal having an increasing or decreasing magnitude, as the case may be). Switch 587 is coupled to processor 592 for receiving a signal, which in turn causes switch 587 to generate a control signal for activating or deactivating half-wave plates 582 and 583.

Note that this resetting method works for any kind of wave plate that operates in a range from 2nπ to 2mπ, where m and n are integers. By using a pair of parallel half-wave plates, however, the range of operation can change to (2n+1)π to (2m+1)π. Conceptually, the conditions of a resetting algorithm are: (1) invariant output SOP during resetting, such that M=M'; and (2) after reset, the operation changes direction, and M(δ)=M'(−δ).

For the above case, resetting occurs at either 0 or 2π, with a pair of crossed half-wave plates oriented at a 45-degree angle to the variable wave-plate, such as shown in FIG. 5C. During resetting, each of two half-wave plates has a phase retardation ε varying from 0 to π, while the phase retardation of the full-wave plate is kept at either 0 or 2π. Given this, the transformation matrix can be represented as:

$$D(\epsilon,\pi/4)D(0,0)D(\epsilon,-\pi/4)=D(0,0) \quad \text{(Equation 13)}$$

or $$D(\epsilon,\pi/4)D(2\pi,0)D(\epsilon,-\pi/4)=D(2\pi,0). \quad \text{(Equation 14)}$$

In view of Equations (13) and (14), the above discussion, and the reset methodology described herein, the SOP of an output light beam does not change for any value of ε during resetting time. In fact, the variable and switchable wave-plates can be any kind of variable phase retarders, such as liquid crystal, fiber squeezer, electro-optical devices, or like devices.

Figure 6:
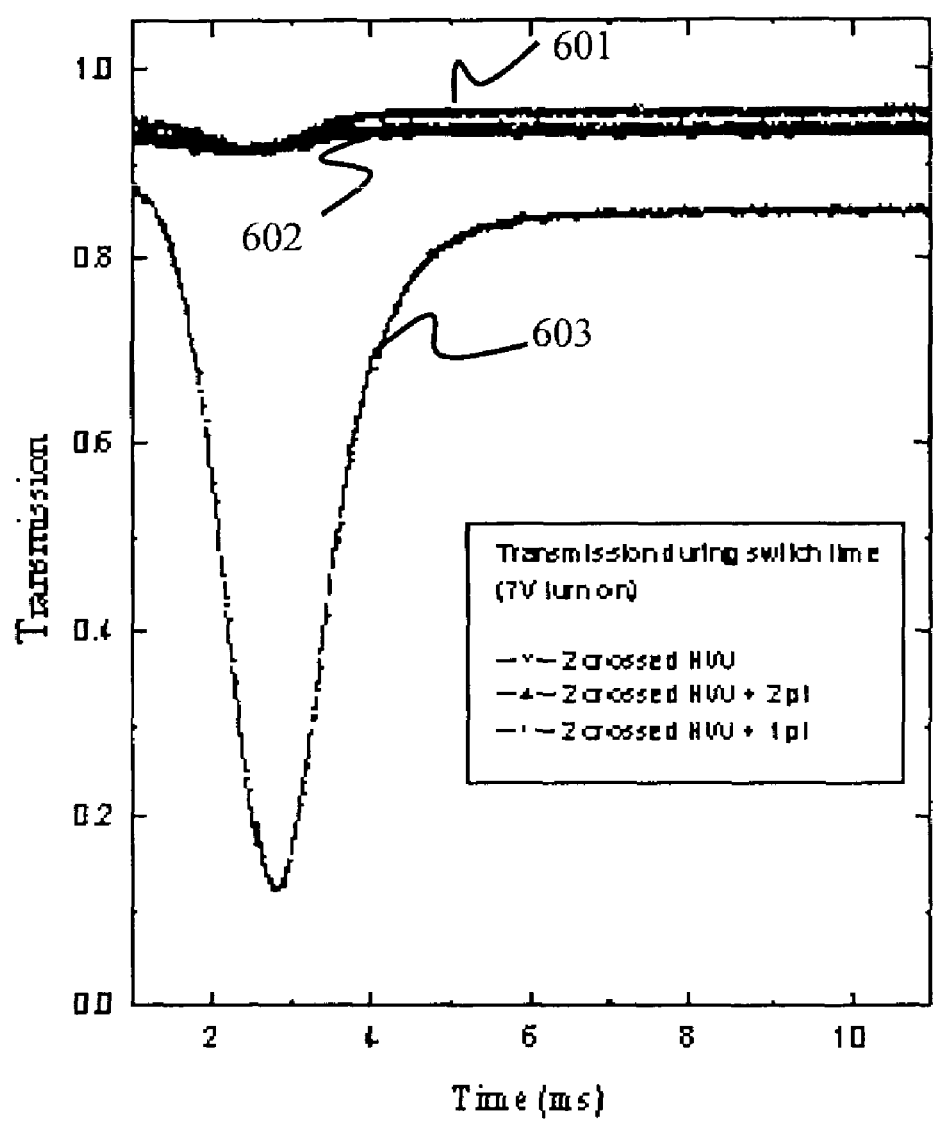
FIG. 6 is a graphical plot of experimental results representing the relative intensity of transmitted light during a reset of the wave plate shown in FIG. 5C.

FIG. 6 shows experimental results of a dynamic transmission of light (whether a light beam or a portion thereof) through full-wave plate 581 shown in FIG. 5C oriented between a pair of liquid crystal half-wave plates similar to pair of half-wave plates 582 and 583 (i.e., oriented 45 degrees to the optical axis of full-wave plate 581). In FIG. 6, a change of transmission indicates a change in SOP and transmission curve 601 results from turning on (i.e., activating) half-wave plates 582 and 583, when the phase retardation of full-wave plate 581 is zero. Transmission curve 602 results from turning on half-wave plates 582 and 583 when the phase retardation of full-wave plate 581 is 2π. Further to this specific case, no more than 0.2 dB of variation has been observed for both resetting cases. Transmission curve 603 results from turning on half-wave plates 582 and 583 when phase retardation of full-wave plate 581 is π. Although π is the point where the most amount of change in SOP occurs, a polarization controller in accordance with the present invention is not required to reset at this point, and as such, does not experience such a large change in SOP.

After exemplary full-wave plate 581 resets, a representative transformation matrix for the controller is either:

$$D(\pi,\pi/4)D(\zeta,0)D(\pi,-\pi/4)=D(-\zeta,0), \quad \text{(Equation 15)}$$

or $$D(\pi,\pi/4)D(2\pi-\zeta,0)D(\pi,-\pi/4)=D(2\pi+\zeta,0) \quad \text{(Equation 16)}$$

where ζ is an arbitrary phase angle. Consequently, the varying direction of the variable phase retarder of FIG. 5C (i.e., full-wave plate 581) is inversed, such that a periodic change in the driver voltage allows for endless tracking of SOP.

FIG. 7 shows an exemplary operating scheme for an endless control signal. Waveform 701 represents the phase of an incident light beam and control signal 702 represents the control voltage applied to phase-retarding full-wave plate 581. Waveform 703 represents corresponding states of resetting devices 582 and 583 between resets. An artisan ordinarily skilled in the art should appreciate that waveforms shown are for illustrative purposes and that a signal shown as increasing or in a high state (i.e., "on") can also be represented a signal that is decreasing or that is in a low state (i.e., "off").

In fact, any pair of retarders (i.e., wave-plates) that trace orthogonal circles on Poincare' sphere 201 of FIG. 2 can reset each other. For example, a pair of 90-degree rotators will also reset a full-wave plate such as the one in FIG. 5C, so long as they are left-hand and right-hand pairs. Further, a pair of crossed half-wave plates can be used to reset a 180-degree rotator or any like rotator.

In some embodiments of the present invention, the method is applicable to any kind of controllable wave plate or rotator (with a rotation range from mπ to nπ, where m and n are integers), including liquid crystal devices, electro-optic devices, magneto-optic devices, fiber-squeezing devices, or like devices.

Figure 8:
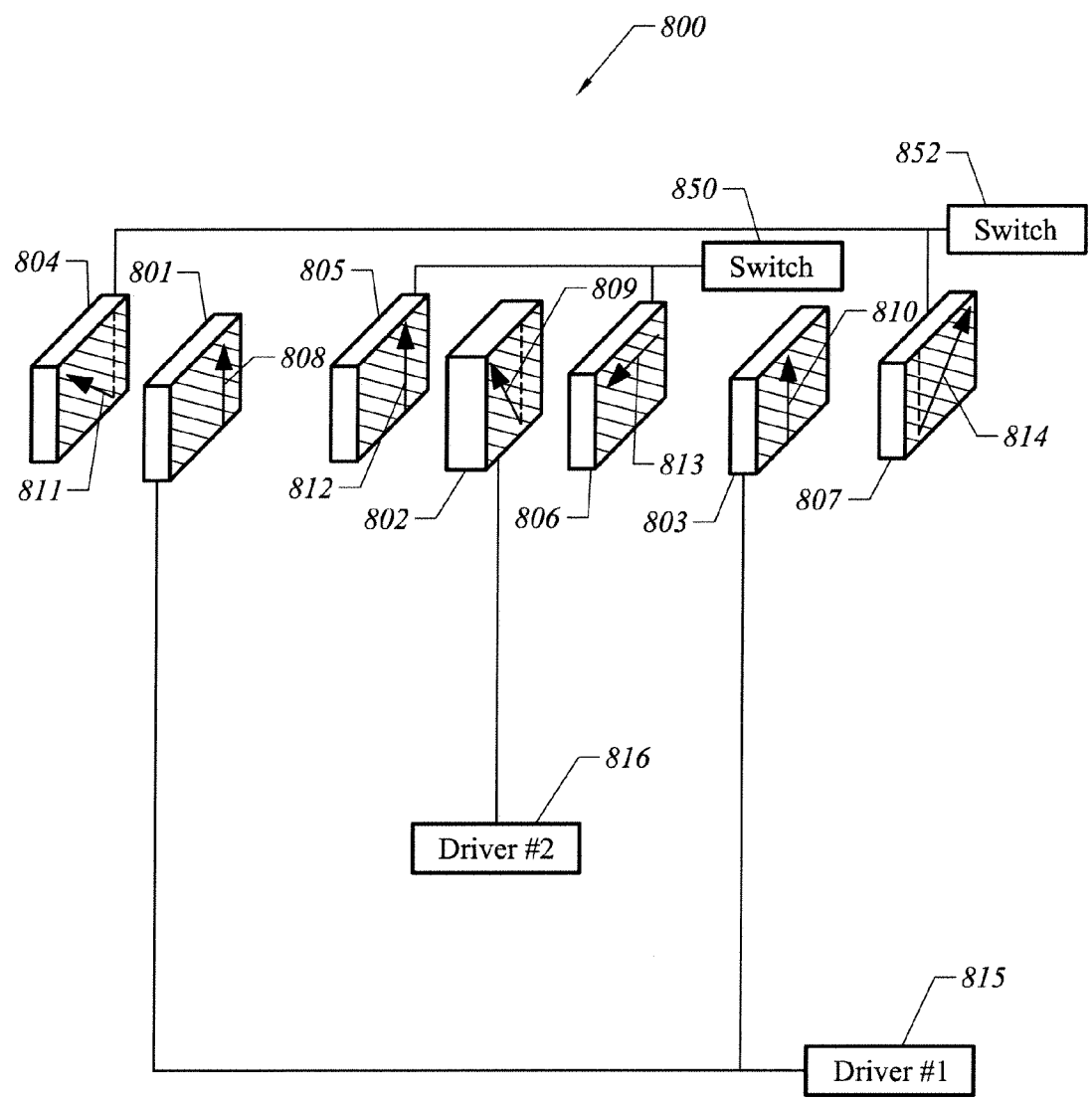
FIG. 8 shows an exemplary polarization controller according to another embodiment of the present invention.

FIG. 8 depicts another exemplary polarization controller in accordance with another embodiment of the present invention. Polarization controller 800 includes polarization controller 300 of FIG. 3 and controls polarization in accordance with the method described above in connection with FIGS. 5A and 5B. Polarization controller 800 includes six variable half-wave plates and a full wave plate, where the full-wave plate is driven independently and two coupled half-wave plates are coupled and driven together by using a single driver. The other two pairs of half-wave plates are used for resetting; one pair resets the coupled wave-plates and the other pair resets the full wave plate. Therefore, this controller needs to address only two variables for controlling polarization, one variable (e.g., angle) per pair of wave-plates.

In FIG. 8, two half-wave plates 801 and 803 are coupled to and controlled by driver 815 (shown as driver #2), and in some cases are similar in structure and functionality as half-wave plates 301 and 302 of FIG. 3. Another pair of half-wave plates 804 and 807 is used to reset the coupled wave-plates 801 and 803. A full-wave plate 802 is driven independently by using driver 816. A pair of half-wave plates 805 and 806 is used to reset 802 and is controlled by switch 850. Optical axes 812 and 813 of respective half-wave plates 805 and 806 are oriented 45 degrees to optical axis 809 of the full wave plate 802, whereas optical axes 811 and 814 of respective half-wave plates 804 and 807 are oriented 0 degrees and 90 degrees to optical axis 809. Half-wave plates 804 and 807 are controlled by switch 852. In some embodiments, this SOP controller is suitable as a substitute for other known electrically controlled polarization controllers.

Figure 9:
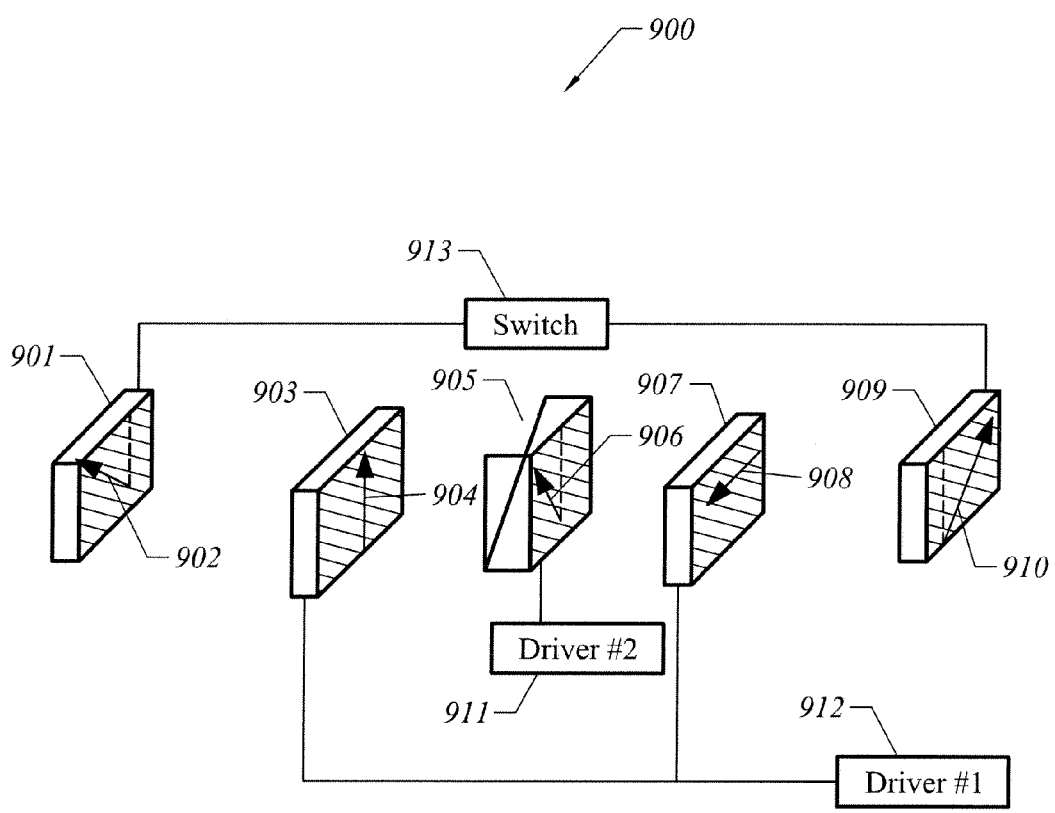
FIG. 9 shows a simplified version of the polarization controller of FIG. 8.

FIG. 9 shows another exemplary polarization controller in accordance with a specific embodiment of the present invention. Polarization controller 900 is a simplified version of polarization controller 800 and is realized by crossing the optical axes of half-wave plates 801 and 803. Given this, only one pair of resetting half-wave plates is needed. The pair of half-wave plates 901 and 909 is controlled by switch 913 and is used to reset full-wave plate 905 and half-wave plates 903 and 907, which are coupled together and are controlled by driver 912. As shown in FIG. 9, optical axes 904 and 908 of respective half-wave plates 903 and 907 are each oriented 45 degrees to optical axis 906 of the full wave plate 905, which is controlled by driver 911. Further, optical axes 902 and 910 of respective half-wave plates 901 and 909 are oriented 0 degrees and 90 degrees to optical axis 906. In particular, 902 and 906 differ by 0 degrees, whereas 910 and 906 differ by 90 degrees. Note that the symmetry of the arrangement of coupled cells of polarization controller 900. This configuration allows a reduction in the number of parts, which in turn, lowers the cost of the controller. As with polarization controller 800, there are only two variables for controlling polarization controller 900.

Figure 10:
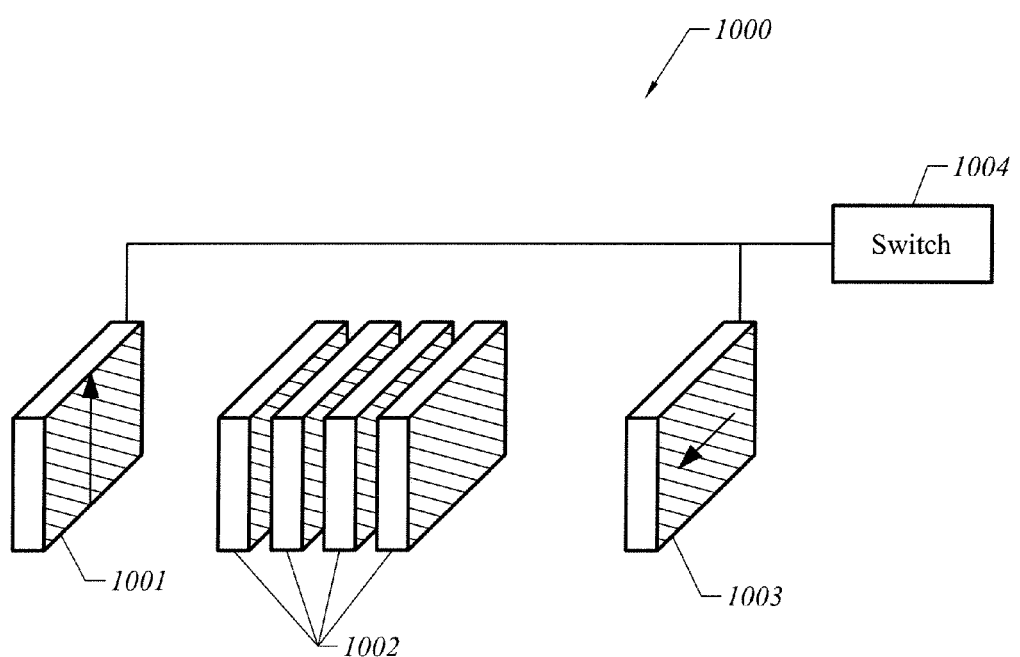
FIG. 10 illustrates another exemplary polarization controller including a polarization rotator according to an embodiment of the present invention.

FIG. 10 illustrates an exemplary polarization controller according to yet another embodiment of the present invention. Polarization controller 1000 is a polarization rotator that includes a stack of twisted nematic devices, or any other like device. The stack includes four twisted nematic liquid crystal cells 1002, which are properly aligned. Although one of ordinarily skilled in the art should appreciate that other suitable twist angles and/or number of TN cells is within the spirit of scope of the present invention. The twist angle of each of the twisted nematic ("TN") cells 1002 should be at or around 135 degrees. Polarization controller 1000 operates by rotating the polarization of an input beam of light into the stack of twisted nematic liquid crystal cells 1002. By controlling the applied voltage, each of the twisted nematic cells 1002 rotates the polarization while maintaining the ellipticity of polarization of the input beam of light. An AC-voltage driver (not shown), for example, drives the four cells 1002 of FIG. 10 to rotate any input SOP to a predefined orientation without substantially affecting the ellipticity. Furthermore, polarization controller 1000 needs only a single variable for control of its functionality.

To operate effectively, the thickness of the liquid crystal layer must be chosen correctly. The thickness, d, and birefringence, $\Delta n$, of liquid crystals should satisfy the following condition:

$$\frac{\Delta nd}{\lambda_o} = \eta \qquad \text{(Equation 17)}$$

Here, $\lambda_o$ is the central wavelength in a band, and $\eta$ is a constant that depends on the twist of the outer nematic layers. For a 135 degree twist $\eta=0.66$, rather than $\eta=0.5$ for a wave plate with a zero degree twist.

In order to eliminate the phase residue when the 135-degree TN cells are fully turned on, the optic axis of the first liquid crystal cell is aligned orthogonal to the second one, and the second orthogonal to the third, and the third orthogonal to the fourth. With no voltage applied, the optic axis rotates nearly uniformly with a total twist angle of 135 degrees when light passes through each TN cell.

Figure 11:
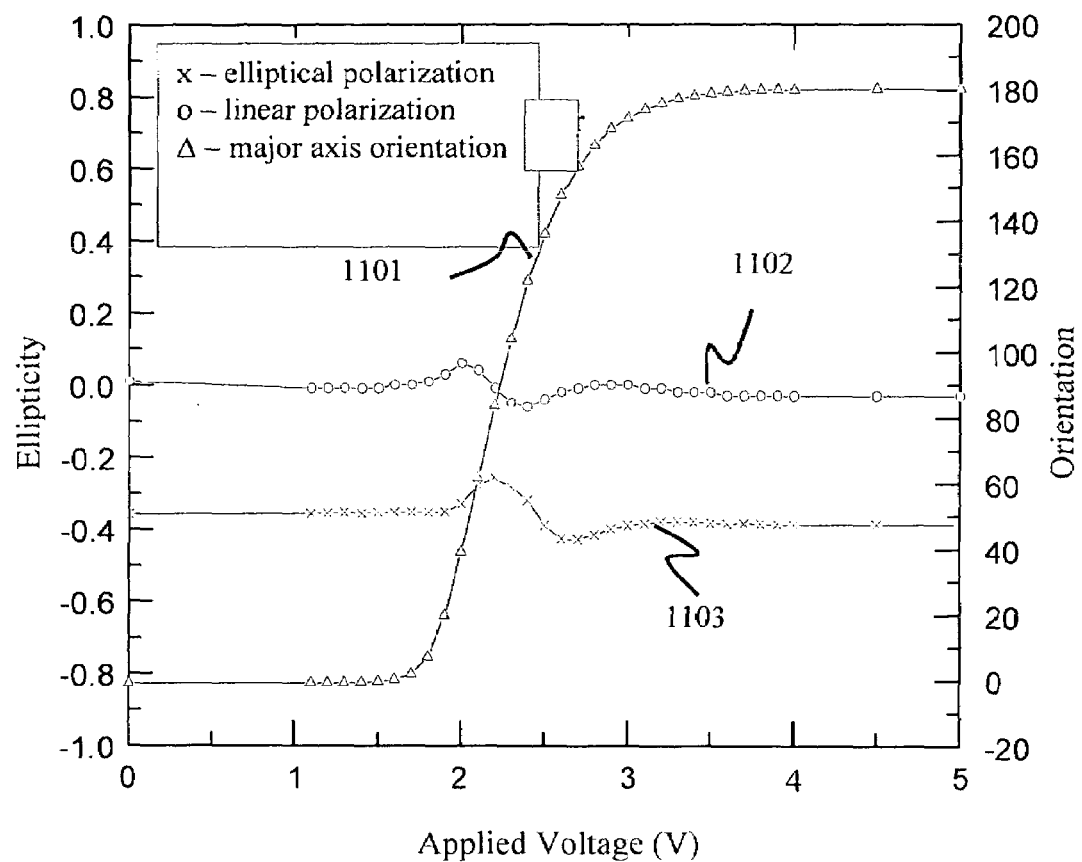
FIG. 11 is a graphical plot of experimental results representing variations in rotation angle and ellipticity using the polarization rotator of FIG. 10.

FIG. 11 shows experimental results of the variations in ellipticity rotation angle as a function of the drive voltage for both a linear and an elliptical SOP light beam passing through cell 1002. Curve 1101 shows the change of orientation angle of a linear polarized light beam from 0 to 180 degrees with an increasing drive voltage. Curve 1102 indicates the variation of the ellipticity of the linear polarized light beam. Curve 1103 represents the variation of the ellipticity of an elliptical polarized light beam. In this specific example, the variation of the ellipticity is less than 6%. In an alternative embodiment, a pair of crossed half-wave plates 1001 and 1003 controlled by switch 1004 can be used to reset the rotator of polarization controller 1000 if endless variation is desired.

Figure 12:
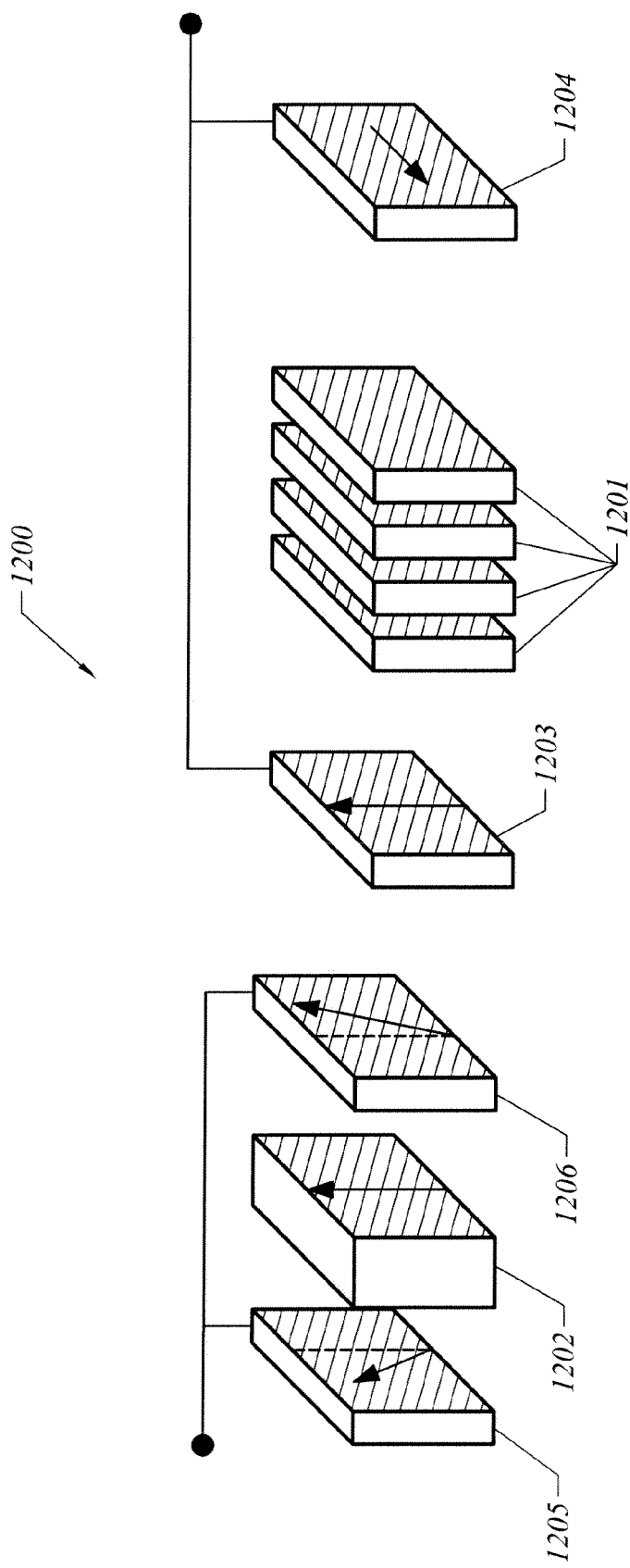
FIG. 12 illustrates an exemplary polarization controller for transforming any input SOP to a predefined output SOP according to an embodiment of the present invention.

FIG. 12 depicts an exemplary polarization controller in accordance with yet another embodiment of the present invention. Polarization controller 1200 is configured to transform any input SOP into a predescribed linear output SOP, which is preferred for some applications. Conceptually, polarization controller 1200 includes a variable wave plate "D" and a rotator "R" and can be represented with the following transforming matrix:

$$M=R(\theta)D(\phi,0) \qquad \text{(Equation 18)}$$

Polarization controller 1200 can be realized using full-wave plate 581 of FIG. 5C and a one-variable SOP rotator (e.g., polarization controller 900) of FIG. 9. Full-wave plate 1202 transforms any input SOP into a linear SOP. A stack of four 135-degree TN cells 1201 functions as a SOP rotator and rotates the linear SOP into a predefined orientation. Therefore, polarization controller 1200 controls and varies the phase retardance and the orientation angle independently, and thus makes polarization control convenient. A pair of crossed half-wave plates 1203 and 1204 can be used to reset the rotator 1201. Another pair of crossed half-wave plates 1205 and 1206 can be applied to reset full-wave plate 1202.

Figure 13:
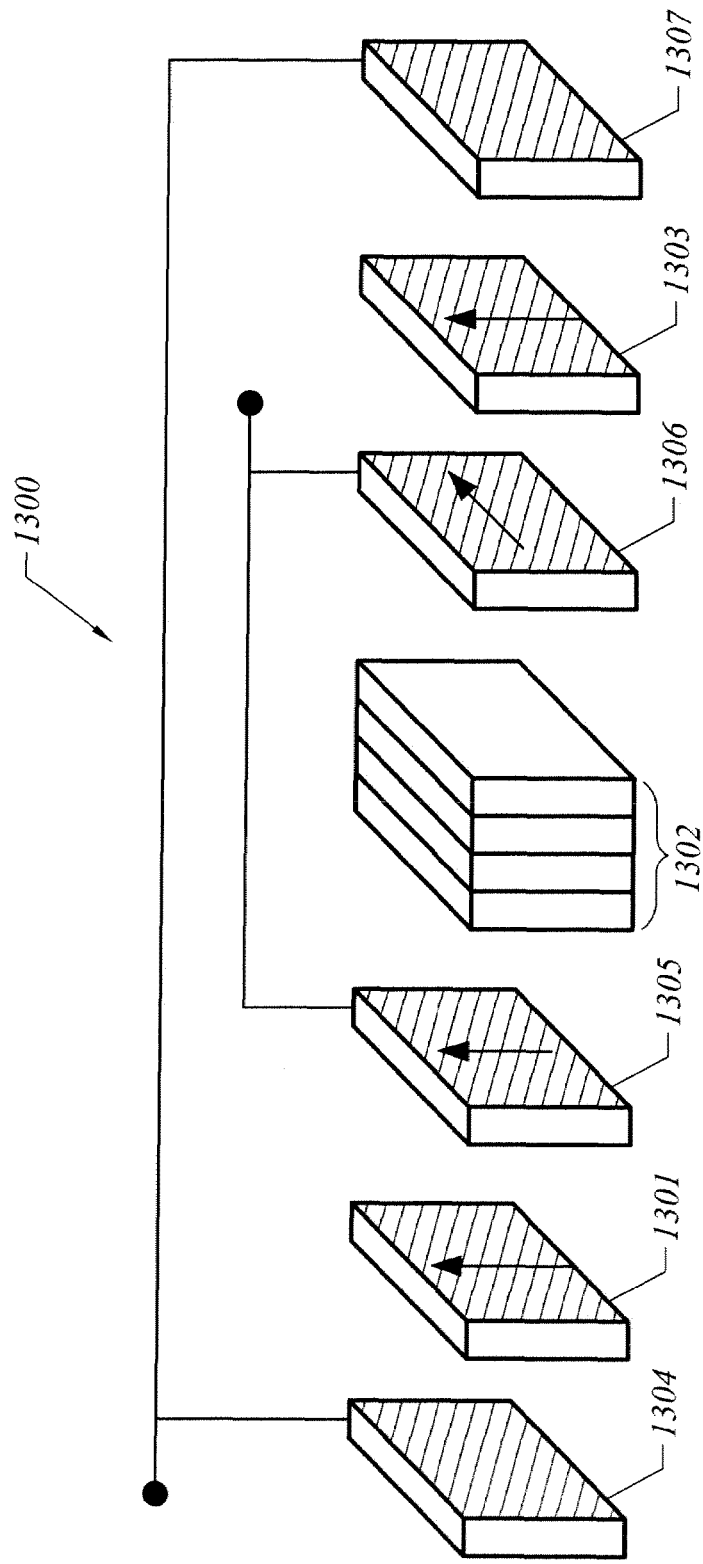
FIG. 13 shows another polarization controller for changing any arbitrary input SOP to any output SOP according to yet another embodiment of the present invention.

FIG. 13 shows an exemplary polarization controller in accordance with yet another embodiment of the present invention. Polarization controller 1300 is configured to provide endless conversion of any arbitrary input SOP to any output SOP, which can be conceptually represented by the following matrix:

$$M=D(\phi,0)R(\theta)D(\phi,0) \qquad \text{(Equation 19)}$$

In this instance, polarization controller 1300 includes two half-wave plates 1301 and 1303 driven by the same driver (not shown). Thus, both have the same phase retardance. Polarization controller 1300 further includes a pair of 90-degree twist nematic cells 1304 and 1307 located at the outer-most ends of the controller. This pair of cells is used to reset wave-plates 1301 and 1303. Another pair of half-wave plates 1305 and 1306 is located as shown in FIG. 13 for resetting the SOP rotator including four 135-degree TN cells 1302. The resetting of polarization controller 1300 can be facilitated using the resetting method set forth above.

Figure 14:
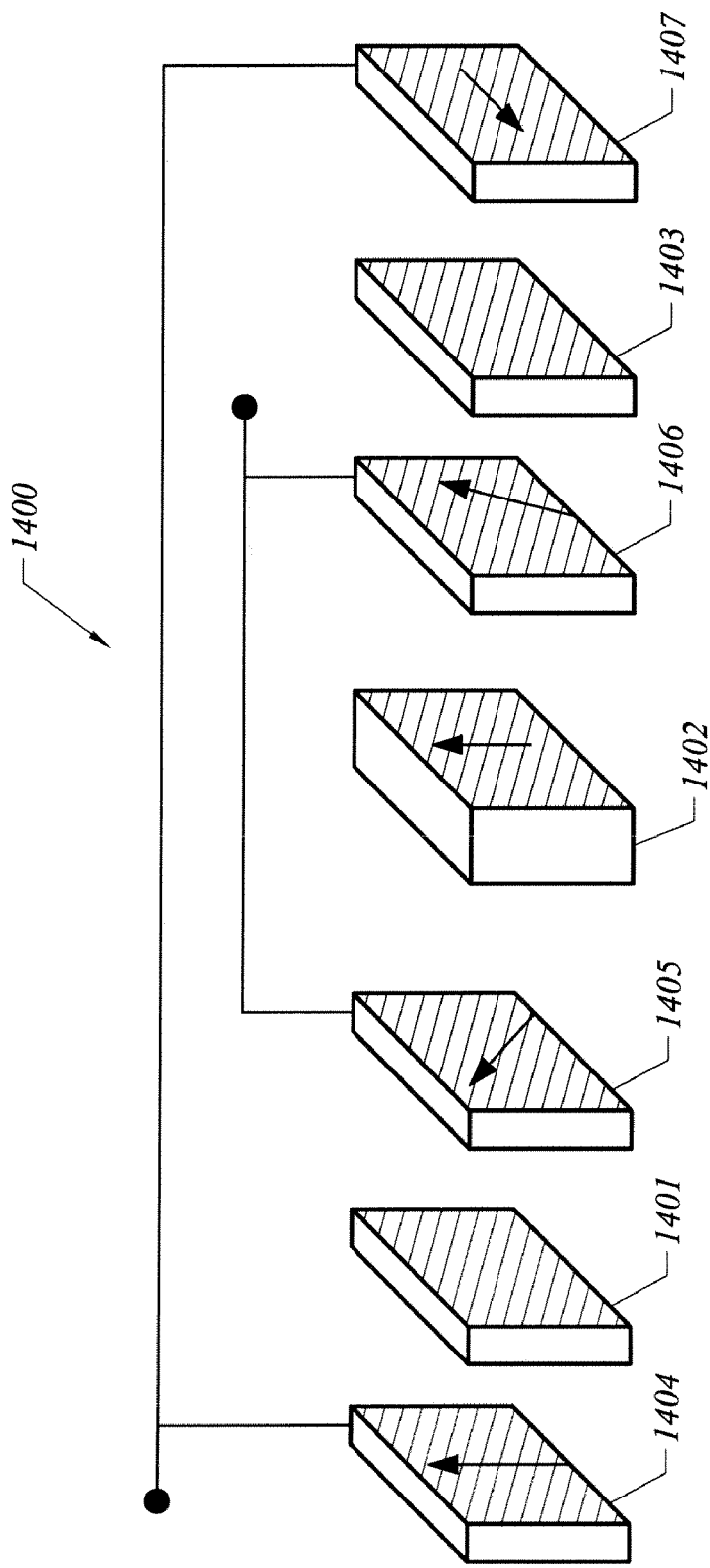
FIG. 14 shows an alternative polarization controller for changing any arbitrary input SOP to any output SOP according to yet another embodiment of the present invention.

FIG. 14 shows another exemplary polarization controller according to an alternative embodiment of the invention. In this case, full-wave plate 1402 is located in the middle of FIG. 14. Half-wave plate pair 1405 and 1406 operates to reset full-wave plate 1402. Two 90-degree rotators 1401 and 1403, each of which includes 135-degree TN cells, are driven together using the same driver (not shown). Another pair of half-wave plates 1404 and 1407 reset rotators 1401 and 1403. One ordinarily skilled in the art should recognize that the two 90-degree rotators could be replaced by two 90-degree TN cells, or that wave-plates of other suitable optical axes are within the spirit and scope of the present invention.

An embodiment of the present invention relates to a computer storage product with a computer-readable medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as floptical disks; and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using Java, C++, or other object-oriented programming language and development tools. Another embodiment of the invention may be implemented in hard-wired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

What is claimed is:

1. A method for resetting a polarization controllers comprising:
    determining that a phase magnitude is associated with a first range of phase angles, and
        generating a first control signal having a first characteristic if the phase magnitude is increasing, and
        generating the first control signal having a second characteristic if the phase magnitude is decreasing; and
    determining that the phase magnitude is associated with a second range of phase angles, and
        generating the first control signal having the second characteristic if the phase magnitude is increasing,
        generating the first control signal having the first characteristic if the phase magnitude is decreasing;
    generating a second control signal having a first state if the phase magnitude is associated with a first range of phase angles;
    generating the second control signal having a second state if the phase magnitude is associated with a second range of phase angles; and
    applying the second control signal to at least two half-wave plates, wherein the first state is an on-state and the second state is an off-state.

2. The method of claim 1 wherein the first characteristic and the second characteristic are a decreasing and an increasing magnitude, respectively, of the first control signal.

3. The method of claim 1 further comprising applying the first control signal to a variable wave-plate.

4. An apparatus for resetting a polarization controllers comprising:
    means for determining that a phase magnitude is associated with a first range of phase angles, and
        generating a first control signal having a first characteristic if the phase magnitude is increasing, and
        generating the first control signal having a second characteristic if the phase magnitude is decreasing; and
    means for determining that the phase magnitude is associated with a second range of phase angles, and
        generating the first control signal having the second characteristic if the phase magnitude is increasing, and
        generating the first control signal having the first characteristic if the phase magnitude is decreasing;
    means for generating a second control signal having a first state if the phase magnitude is associated with a first range of phase angles;
    means for generating the second control signal having a second state if the phase magnitude is associated with a second range of phase angles; and
    means for applying the second control signal to at least two half-wave plates;
    wherein the first state is an on-state and the second state is an off-state.

5. The apparatus of claim 4 wherein the first characteristic and the second characteristic are a decreasing and an increasing magnitude, respectively, of the first control signal.

6. The apparatus of claim 4 further comprising means for applying the first control signal to a variable wave-plate.

* * * * *